(12) United States Patent
Dreslinski et al.

(10) Patent No.: US 8,989,904 B2
(45) Date of Patent: Mar. 24, 2015

(54) ROBOTIC PROCESS LOGGER

(75) Inventors: Scott Dreslinski, Rochester Hills, MI (US); Bradley O. Niederquell, Troy, MI (US)

(73) Assignee: Fanuc Robotics America Corporation, Rochester Hills, MI (US)

( * ) Notice: Subject to any disclaimer, the term of this patent is extended or adjusted under 35 U.S.C. 154(b) by 244 days.

(21) Appl. No.: 13/405,954

(22) Filed: Feb. 27, 2012

(65) Prior Publication Data

US 2013/0226346 A1    Aug. 29, 2013

(51) Int. Cl.
*G05B 19/04* (2006.01)
*B25J 9/16* (2006.01)
*G05B 19/418* (2006.01)

(52) U.S. Cl.
CPC ..... *B25J 9/1674* (2013.01); *G05B 2219/35291* (2013.01); *G05B 2219/40213* (2013.01)
USPC ........... 700/264; 700/245; 700/248; 700/250; 700/252

(58) Field of Classification Search
CPC .............. G05B 19/425; G05B 19/427; G05B 2219/36159; B25J 9/1671
USPC ......... 700/192, 247, 248, 249, 250, 251, 258, 700/262, 264, 283, 86, 88; 901/15, 3, 30, 901/42, 6, 7, 9
See application file for complete search history.

(56) References Cited

U.S. PATENT DOCUMENTS

| | | | | |
|---|---|---|---|---|
| 5,204,942 A | * | 4/1993 | Otera et al. | 700/248 |
| 5,315,222 A | * | 5/1994 | Kasagami et al. | 318/568.11 |
| 5,469,352 A | * | 11/1995 | Yukutomo et al. | 700/87 |
| 5,517,639 A | * | 5/1996 | Yamaguchi | 700/108 |
| 5,845,149 A | * | 12/1998 | Husted et al. | 710/9 |
| 6,065,857 A | * | 5/2000 | Hazama et al. | 700/95 |
| 6,442,444 B2 | * | 8/2002 | Matsubara et al. | 700/95 |
| 6,459,958 B1 | * | 10/2002 | Watanabe et al. | 700/264 |
| RE38,570 E | * | 8/2004 | Karakama et al. | 700/212 |
| 7,127,307 B2 | * | 10/2006 | Sasaki et al. | 700/96 |
| 7,302,302 B2 | * | 11/2007 | Dolansky | 700/19 |
| 7,355,145 B2 | * | 4/2008 | Ikeda et al. | 219/130.01 |
| 7,375,304 B2 | * | 5/2008 | Kainec et al. | 219/130.01 |
| 7,567,853 B2 | | 7/2009 | Kreidler et al. | |
| 7,912,584 B2 | * | 3/2011 | Nagatsuka et al. | 700/245 |
| 8,569,646 B2 | * | 10/2013 | Daniel et al. | 219/61.5 |
| 2002/0107825 A1 | * | 8/2002 | Manicke et al. | 706/47 |
| 2007/0129826 A1 | * | 6/2007 | Kreidler et al. | 700/83 |
| 2009/0157224 A1 | * | 6/2009 | Blanc et al. | 700/250 |
| 2010/0106285 A1 | | 4/2010 | Massey | |
| 2011/0082586 A1 | * | 4/2011 | Nishihara | 700/259 |

* cited by examiner

*Primary Examiner* — Ian Jen
(74) *Attorney, Agent, or Firm* — Fraser Clemens Martin & Miller LLC; William J. Clemens (57) ABSTRACT

A method for controlling a robot includes the step of controlling operation of the robot with a robot controller executing a control program having a plurality of process instructions. Associated process data for each of predetermined ones of the process instructions executed by the robot controller is then collected. The collected process data is subsequently stored in a form uniquely identified by at least one unique identifier. The at least one unique identifier may include both the program identifier and the process instruction identifier. The collected process data may be stored on the robot controller.

20 Claims, 7 Drawing Sheets

```
┌─────────────────────────────────────────────────────┐
│ PAT REPORTING                                       │
├─────────────────────────────────────────────────────┤
│                                               1/10 │
│     APPLICATION:        SPOT                        │
│     REPORT TYPE:        USER DEFINED                │
│     FILTERS                                         │
│       1: EXEC_TIME                                  │
│          START DATE: 07/NOV TIME: 00:00:00          │
│          END DATE  :19/NOV TIME: 23:59:59           │
│       2: WELD TIME             > 2000.00            │
│       3: NONE                  = 0.00               │
│       4: NONE                  = 0.00               │
│       5: NONE                  = 0.00               │
│     OUTPUTS                                         │
└─────────────────────────────────────────────────────┘
```

FIG. 5

```
┌─────────────────────────────────────────────────────┐
│ THIS FILE WAS CREATED ON 30-NOV 15:21 FROM SPOTTOOL+│
│ ROBOT F-NUMBER: F00000                              │
│ ROBOT HOSTNAME: V80010PAT                           │
│                                                     │
│ STYLE                                               │
│    SPOT[1] HIST INDEX =1                            │
│    SPOT[1] HIST INDEX =2                            │
│    SPOT[1] HIST INDEX =3                            │
│     GLOBAL STATS FOR PROCESS ID:1 AFTER 35 WELDS.   │
│     WELD TIME: MIN= 176.00 MAX= 3000.00 AVG=2757.94 │
│                                                     │
│    SPOT[2] HIST INDEX =1                            │
│    SPOT[2] HIST INDEX =2                            │
│    SPOT[2] HIST INDEX =3                            │
│     GLOBAL STATS FOR PROCESS ID:3 AFTER 34 WELDS.   │
│     WELD TIME: MIN= 176.00 MAX= 3000.00 AVG= 2750.82│
│                                                     │
│    SPOT[3] HIST INDEX =1                            │
│    SPOT[3] HIST INDEX =2                            │
│     GLOBAL STATS FOR PROCESS ID:3 AFTER 34 WELDS.   │
│     WELD TIME: MIN= 176.00 MAX= 3000.00 AVG= 2652.24│
│                                                     │
│    SPOT[5] HIST INDEX =1                            │
│    SPOT[5] HIST INDEX =2                            │
│     GLOBAL STATS FOR PROCESS ID:4 AFTER 34 WELDS.   │
│     WELD TIME: MIN= 176.00 MAX= 3000.00 AVG=2596.57 │
│                                                     │
│ 11 WELDS WITH MATCHING PARAMETERES FOUND.           │
│ AVG WELD TIME =  2988.36                            │
│ MAX WELD SCHED =    5.00                            │
└─────────────────────────────────────────────────────┘
```

FIG. 6

```
┌─────────────────────────────────────────────────────────────┐
│ PROCESS REPORTING                                           │
├─────────────────────────────────────────────────────────────┤
│                                              7/13           │
│       1:EXEC_TIME                                           │
│          START DATE:16/JAN TIME: 00:00:00                   │
│          END DATE   :16/JAN TIME: 23:59:00                  │
│       2: WELD TIME          >   600.00                      │
│       3: NONE               =   0.00                        │
│       4: NONE               =   0.00                        │
│       5: NONE               =   0.00                        │
│     OUTPUTS                                                 │
│       1:MIN      WELD TIME                                  │
│       2:MAX      WELD TIME                                  │
│       3:AVG      WELD TIME                                  │
├──────┬────────┬─────────┬────────┬────────┬─────────┬──────┤
│      │ [TYPE] │         │  EXEC  │        │  CLEAR  │  >   │
└──────┴────────┴─────────┴────────┴────────┴─────────┴──────┘
  208
```

F NUMBER: 1037567
VERISON : SPOTTOOL+
1/6/
DATE:     18-JAN 13:53

SPOT WELD PROCESS SUMMARY FILE                                402

| HIST_IDX | PRO-GRAM | PROCESS_ID | TOUCHUP_TIME | EXEC_TIME | FAULT | BOOK-MARK | WELD TIME (MS) | TIME TO FORCE (MS) | WELD SCHED | SD INDEX | P INDEX |
|---|---|---|---|---|---|---|---|---|---|---|---|
| 1 | DEMO_LINE | 1 | 09-JAN 16:13 | 18-JAN 13:44 | NONE | 00-0-80 00:00 | 560 | 112 | 1 | 1 | 1 |
| 2 | DEMO_LINE | 1 | 09-JAN 16:13 | 18-JAN 13:45 | NONE | 00-0-80 00:00 | 600 | 56 | 1 | 1 | 1 |
| 3 | DEMO_LINE | 1 | 09-JAN 16:13 | 18-JAN 13:45 | NONE | 00-0-80 00:00 | 608 | 56 | 1 | 1 | 1 |
| 4 | DEMO_LINE | 1 | 09-JAN 16:13 | 18-JAN 13:45 | NONE | 00-0-80 00:00 | 552 | 64 | 1 | 1 | 1 |
| 5 | DEMO_LINE | 1 | 09-JAN 16:13 | 18-JAN 13:46 | NONE | 00-0-80 00:00 | 568 | 56 | 1 | 1 | 1 |
| 6 | DEMO_LINE | 1 | 09-JAN 16:13 | 18-JAN 13:46 | NONE | 00-0-80 00:00 | 360 | 56 | 1 | 1 | 1 |
| 7 | DEMO_LINE | 1 | 09-JAN 16:13 | 18-JAN 13:46 | NONE | 00-0-80 00:00 | 592 | 56 | 1 | 1 | 1 |
| 8 | DEMO_LINE | 1 | 09-JAN 16:13 | 18-JAN 13:46 | NONE | 00-0-80 00:00 | 584 | 56 | 1 | 1 | 1 |

ROBOTIC PROCESS LOGGER

FIELD OF THE INVENTION

The present invention relates generally to a robot system and method and, more particularly, to a system and method for collecting and storing data relating to a process executed by a robot.

BACKGROUND OF THE INVENTION

Robot systems have included status screens, generally found on computer monitors or on teach pendants, in which information about a process executed by a robot is shown. It has been common to record the information about the process by manually tabulating the information. However, the information has not heretofore been otherwise stored for further analysis. Additionally, the process information has typically been a limited collection of data unrelated to individual process instructions within a robot program.

There is a continuing need for a system and method for collecting and storing application process specific information for each application instruction/process performed by the robot controller. Desirably, the system and method provides means for displaying and reporting the application process specific information.

SUMMARY OF THE INVENTION

In concordance with the instant disclosure, a system and a method for collecting and storing application process specific information for each application instruction/process performed by the robot controller, and which system provides means for displaying and reporting the application process specific information, are surprisingly discovered.

The system and method of the present disclosure collect specific process data during the execution of an application's process instructions. The data for the application's process is uniquely tagged by the program name and a process identifier associated with the current process instruction being executed. The process data collected depends on the application being used. The process identifier definition for each application is defined by the application. Depending on the application, many histories for each process instructions execution can be stored. There are a number of ways to access and view the collected data, which include the following methods: using a remote personal computer such as a desktop computer or a mobile phone, as nonlimiting examples, and network to remotely access the data; and using a teach pendant to access the data.

In an exemplary embodiment, the system and the method include a robot controller collecting, storing, displaying and reporting application process specific information for each application instruction/process performed by the robot controller. Application instructions are statements/commands embedded in the robot trajectory program that request the robot software to perform an action. These actions pertain to the starting or ending of an arc weld, a sealing segment, a paint segment, picking up an object, performing a spot weld, laser cutting, waterjet cutting, drilling, or other actions specifically requested by the robot controller. Each instruction will have process summary data associated with it. Each instruction is uniquely identified by the program name and process ID of the instruction.

Data collection: When one of the above actions is performed, the robot software will collect multiple detailed application specific data. This data ranges from an identifier of the specific location in the robot's path to process measurements captured by the robot from external sensors and/or by controls or processes internal to the robot controller.

Application specific information includes but is not limited to:
  Time of execution;
  Time associated position was touched up;
  Weld ID or process ID;
  Robot location;
  Part thickness before and after weld;
  Servogun Temperature;
  Feedback from weld timer;
  Servogun force requested and achieved;
  Weld time;
  Weld distance;
  Average current, voltage, and wire feed speed;
  Arc retry counts;
  Work and travel angle;
  Count for voltage/current exceeding threshold;
  Average electrostatic voltage;
  Gun on time;
  Max, min and average bell speed;
  Max, min and average shaping air;
  Pump torque;
  Setpoint errors;
  Sealant applied; and
  Max/min/average material pressure.

At least one set of application specific data is collected each time the instruction is executed.

Data Storage: Each time the instruction is executed the data is collected and stored. Data storage has several options, including: 1) Data saved on the robot controller's internal memory; 2) Data saved to external memory devices (memory cards, hard drives, etc); and 3) Data is pushed to a remote device such as a cloud server.

Data is always associated with the robot program that contained the instruction. Data can be stored in a variety of formats including csv, xml, or in a binary format.

Data Display: Data saved to an external device can be utilized by other products. The robot's teach pendant also provides the ability to display and produce reports based on the stored data. To display collected data from the teach pendant, the operator selects a robot program containing application instructions. When the operator has the cursor on an application instruction the corresponding list of data is displayed. The operator can optionally browse through the data along with a history of the recorded data.

To enhance the viewing of data, when the operator places the teach pendant cursor on a data item, a chart is displayed where the history of the data item can be graphically viewed. The ability to view the history of the data provides the user valuable feedback on the stability of their process.

Reports: From the robot's teach pendant the data can be filtered to provide reports. There are predefined reports and preset filtering. To create a report the operator uses the status menu that will allow the user to create/run reports on recorded specific process parameters that the user is interested in, or pre-defined application supplied reports. For example, the menu will allow the operator to use the data that is most appropriate to the user and provide an endless number of ways to "look" at the data. Multiple filters are provided. For example, the user may have more than five filters to use. The filters are the data items being collected. Multiple comparators are available for the filter such as >, <, or =. The comparator for the filter can be >, <, =, and the user can specify the value.

A report will be generated that shows all matching results of the filters.

The user will have multiple outputs, the outputs will be the items being collected, and the user can specify a MIN, MAX, or AVG for the output item for the data set found for the filters.

Filter 1 can be specified to be execution time so that the operator can filter on data from a specific date/time. The user defined filters can be saved into an xml file so that the user can recall his/her favorite filters at a later time.

For each application data item, MIN, MAX, and AVG are calculated and stored until they are reset, this way the user can have statistical data for a long time, and not just from a 50 or 100 item history. These are called global statistics. The global statistics are output during a report for the items the user is filtering on for each weld.

On the teach pendant, a report can be displayed. There is a button to save the report to the default device.

This feature benefits the user by allowing the user to analyze process summary data that is automatically collected for the user, and to associate that process data with programs/instructions/positions for better diagnostic capabilities.

Production Reporting: Production reporting provides the ability to maintain data related to each job/part cycle performed on the controller. For example, for each job/part store data such as weld spots performed, volume of paint, amount of wire, amount of sealant, cycle time, carrier number, faults generated, time of start/end and any other event that should be collected when a job/part is performed by the robot. Like process data, this data can be stored on the internal robot controller or can be sent to memory devices external to the controller.

"Production" reports can be generated on how many times any given program has been run, how many welds a program does, averages during a production run of a program, maximums during a production run of a program, etc.

In one embodiment, a method for controlling a robot includes the steps of; controlling operation of the robot with a robot controller executing a control program having a plurality of process instructions; collecting associated process data for each of predetermined ones of the process instructions executed by the robot controller; and storing the collected process data in a form uniquely identified by at least one unique identifier.

In a further embodiment, the at least one unique identifier of the method includes both the program identifier and the process instruction identifier. The collected process data is also stored on the robot controller.

In another embodiment, a system for controlling a robot includes a robot controller and a data storage. The robot controller is in communication with the robot and executes a control program having a plurality of process instructions. Associated process data for each of predetermined ones of the process instructions executed by the robot controller is collected and stored on the data storage. The collected process data is stored in a form uniquely identified by at least one unique identifier.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following description is merely exemplary in nature and is not intended to limit the present disclosure, application, or uses. It should be understood that throughout the drawings, corresponding reference numerals also indicate like or corresponding parts and features. In respect of the methods disclosed, the steps presented are exemplary in nature, and thus, are not necessary or critical.

Figure 1:
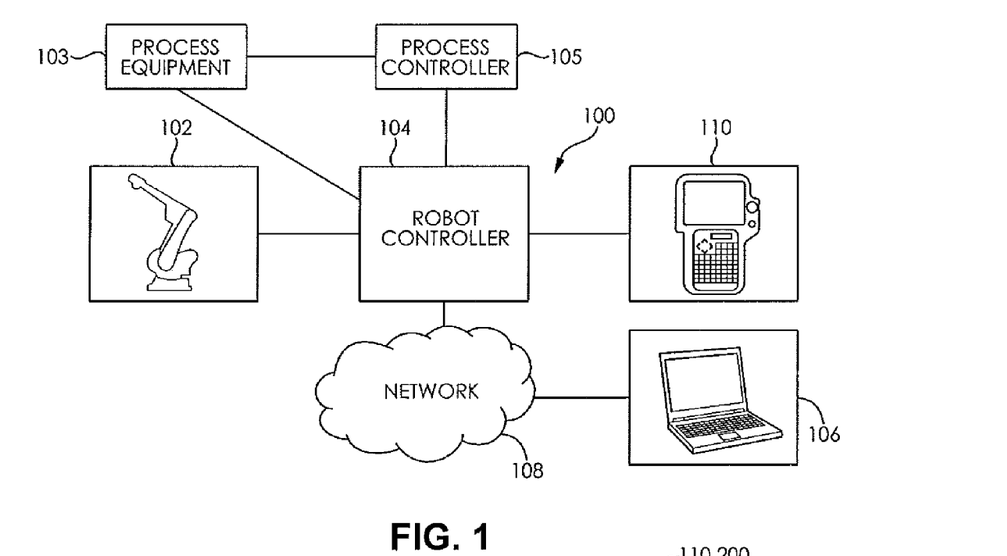
FIG. 1 is a schematic diagram showing a system for controlling a robot according to one embodiment of the present disclosure.

FIG. 1 shows a system 100 for controlling a robot 102, according to one embodiment of the disclosure. The system 100 includes a robot controller 104 in communication with the robot 102. Additionally, the robot controller 104 may be in communication with an external controller 105 of process equipment 103 with which the robot 102 is interacting. As nonlimiting examples, the process equipment 103 may include welding equipment, sealing equipment, transducers, painting equipment, and the like that is being handled by the robot 102. The external process controller 105 may be mounted on the process equipment 103 or disposed on the floor adjacent the robot 102, for example. The external process controller 105 may collect and provide data to the robot controller 104 relating to the process being executed. In other embodiments, the process equipment 103 itself, for example, in the case of a transducer, may provide data directly to the robot controller 104.

The robot controller 104 is configured to execute a control program having a plurality of process instructions. The system also includes a data storage on which associated process data for each of predetermined ones of the process instructions executed by the robot controller 104 is collected and stored. The data storage may include one of an internal memory of the robot controller 104, an external memory device 106 such as a personal computer or the like, and a remote device such as a cloud server available via a network 108 such as the Internet. Where the data storage is the internal memory of the robot controller 104, the data storage may be mirrored to remote storage for the purpose of maintaining a long-term record of the process data. Other forms of data storage may also be employed within the scope of the present disclosure.

The system 100 may further include a teach pendant 110. The teach pendant 110 is in communication with the robot controller 104. The teach pendant 110 permits a user to view and analyze the associated process data, and create a report based on a selected type of the associated process data. In other examples, the associated process data may be viewed and analyzed, and a report created based on the selected type, through use of a personal computer connected to the robot controller 104 through the Internet.

Figure 2:
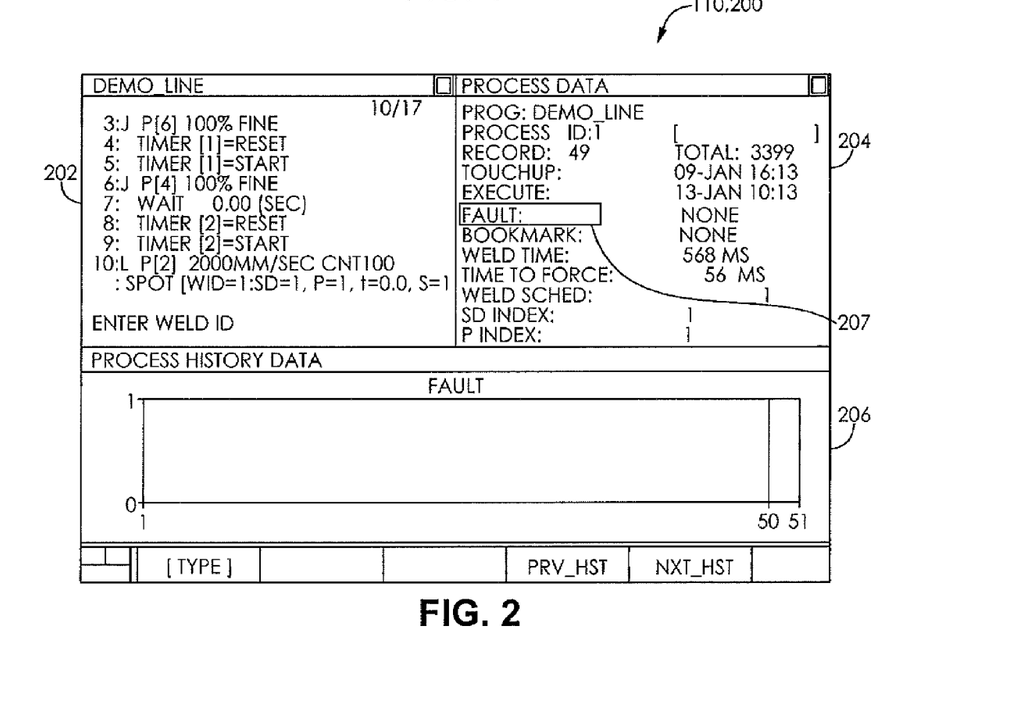
FIG. 2 is a an exemplary display on a teach pendant according to one embodiment of the present disclosure, the display having multiple panels for analysis of collected process data and identifying whether a fault had occurred.
Figure 3:
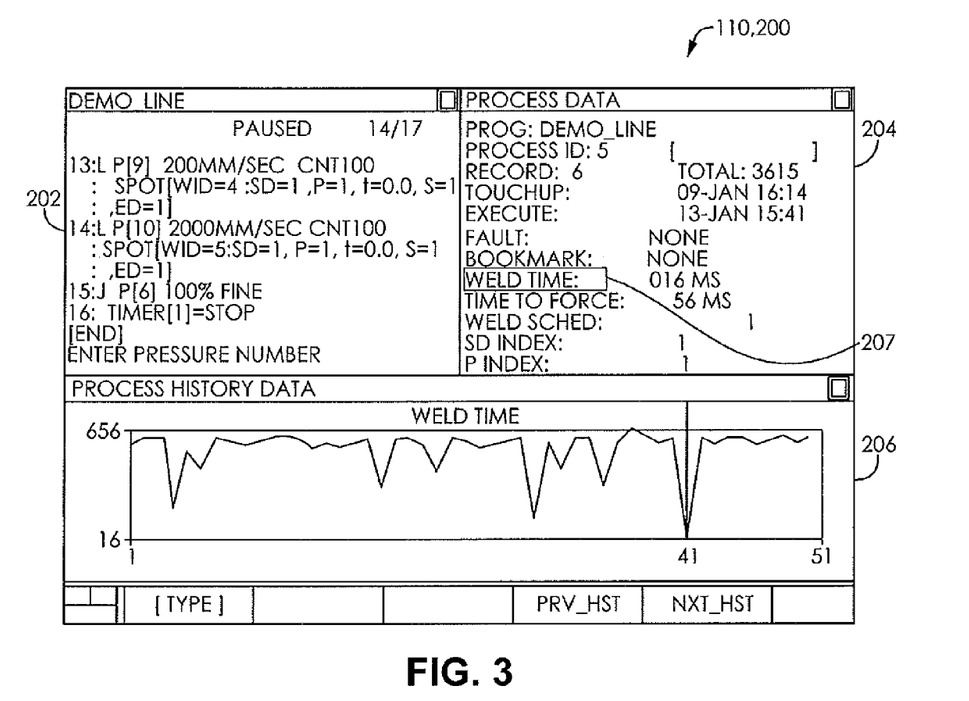
FIG. 3 is an exemplary display on a teach pendant according to another embodiment of the present disclosure, the display having multiple panels for analysis of collected process data and identifying a trend in weld time as a selected type of process history data.

In a particular embodiment, for example, as shown in FIGS. 2 and 3, the teach pendant 110 may have a display 200. The display 200 may include multiple panes. For example, the display 200 may include a first pane 202, a second pane 204, and a third pane 206. Any other number of panes may also be used, as desired. The first pane 202 may show information on the process instructions executed by the robot controller 104. The first pane 202 may include an editor for viewing by the user. The second pane 204 may show the associated process data. The third pane 206 may show a trend of a selected type of the associated process data. The automatic trending of the process data, for example, in graphical or chart format, advantageously provides a rapid means for a user to confirm that the robot controller 104 controlling the process robot 102 is operating properly. The display 200 may also include controls that permit a scrolling through histories of the collected process data. The display 200 may also include a cursor 207 that permits the user to select the type of process data to be viewed and analyzed in the display 200. The display 200 may include an alternative interface for the user to access and analyze the associated process data, as desired.

The display 200 may also include at least one threshold value relative to the collected process data, and may further generate a threshold alarm where the collected process data exceeds the at least one threshold value. As nonlimiting examples, the threshold alarm may be approximately +1-10% of a nominal value for the process data being collected. Other limits for the threshold alarm may be selected, as desired.

The present disclosure includes a method for controlling the robot 102 and related robot processes. The method includes the step of controlling operation of the robot 102 with the robot controller 104 executing the control program having the plurality of process instructions. The associated process data for each of predetermined ones of the process instructions executed by the robot controller 104 are then collected. For example, the process data may be collected from sensors or feedback from the robot 102 as the robot 102 is operated according to the control program. Advantageously, and as described further herein, the collected process data of the present disclosure is stored in a form identified by at least one unique identifier.

In particular embodiments, the at least one unique identifier is at least one of a program identifier and a process instruction identifier. In a most particular embodiment, the at least one unique identifier includes both the program identifier and the process instruction identifier. This means that each set of the collected process data is tagged with the unique identifier such as at least one of the program and the process instruction related to the set of collected process data. It should be appreciated that the use of the both the program identifier and the process instruction identifier to uniquely tag and identify the collected process data permits the user to later analyze the collected process data on both a per-program and a per-process basis.

It should be understood that the collected process data associated with the at least one unique identifier may be stored as a unique history relating to each particular program and process instruction executed by the robot controller 104. A predetermined number of histories may be collected and held in cache or the data storage at any particular time for review and analysis. As a nonlimiting example, up to about 50 histories may be collected and held in cache or the data storage at any particular time. The histories may also be uploaded to external data storage for later retrieval, review, and analysis. A skilled artisan may select alternative numbers of histories to hold in cache or the data storage, and means for uploading the histories to the external data storage, as desired.

The associated process data is collected during execution of the control program each time one of the plurality of process instructions is executed. As nonlimiting examples, the associated process data includes at least one of time of execution, time associated position was touched up, process instruction identifier, robot location, part thickness before and after weld, servogun temperature, feedback from weld time, servogun force requested and achieved, weld time, weld distances, average current, average voltage, and average wire feed speed, arc retry counts, work and travel angle, count for voltage/current exceeding threshold, average electrostatic voltage, gun on time, maximum bell speed, minimum bell speed, average bell speed, maximum shaping air, minimum shaping air, average shaping air, pump torque, setpoint errors, sealant applied, maximum material pressure, minimum material pressure, and average material pressure. Other types of associated process data may also be collected within the scope of the disclosure.

Following collection of the associated process data, the associated process data is stored on one of an internal memory of the robot controller 104, an external memory device, and a remote device such as a cloud server. In a particular embodiment, the associated process data is stored on the robot controller 104 in communication with the robot 102. One of ordinary skill in the art may select other means for storing the associated process data, as desired.

The method of the present disclosure may further include the steps of displaying and reporting the stored process data for each of the process instructions, for example, as shown in FIGS. 4-10. For example, the stored process data may be displayed on one of the teach pendant 110 and the personal computer 106. Importantly, the displaying and the reporting may be performed in non-real time, i.e., after the associated process data has been collected, for the purpose of evaluating a historical performance of the robot 102.

Figure 4:
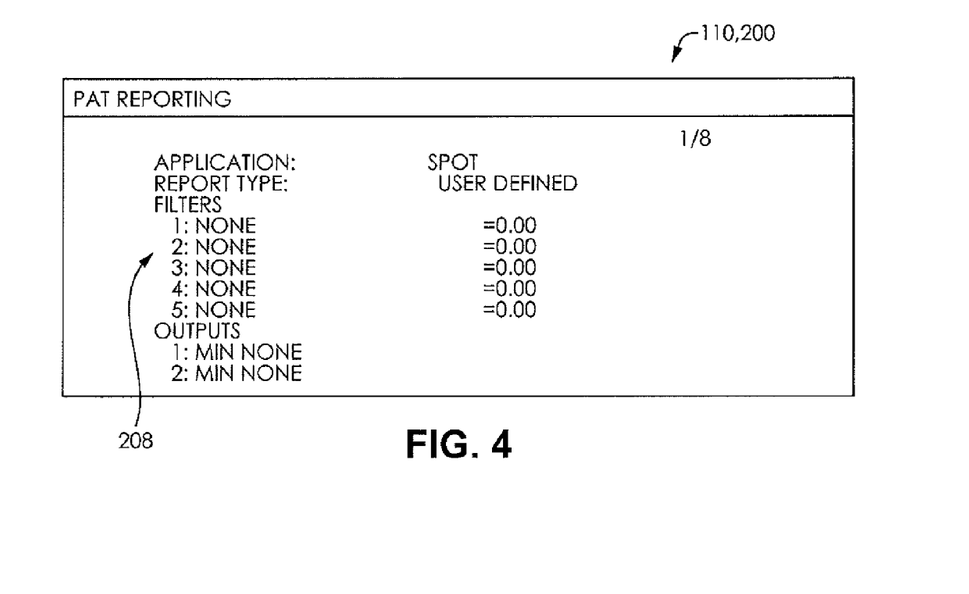
FIG. 4 is an exemplary display on a teach pendant according to a further embodiment of the present disclosure, the display permitting a user to filter collected process data and generate a report, the display shown pre-selection by the user.
Figure 5:
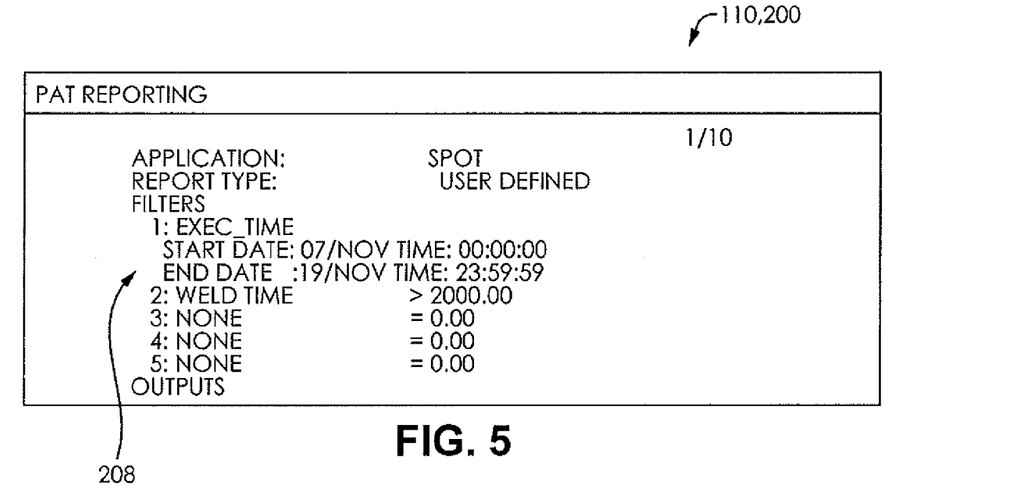
FIG. 5 is another view of the display on the teach pendant as shown in FIG. 4, the display permitting a user to filter collected process data and generate a report, the display shown post-selection by the user.
Figure 6:
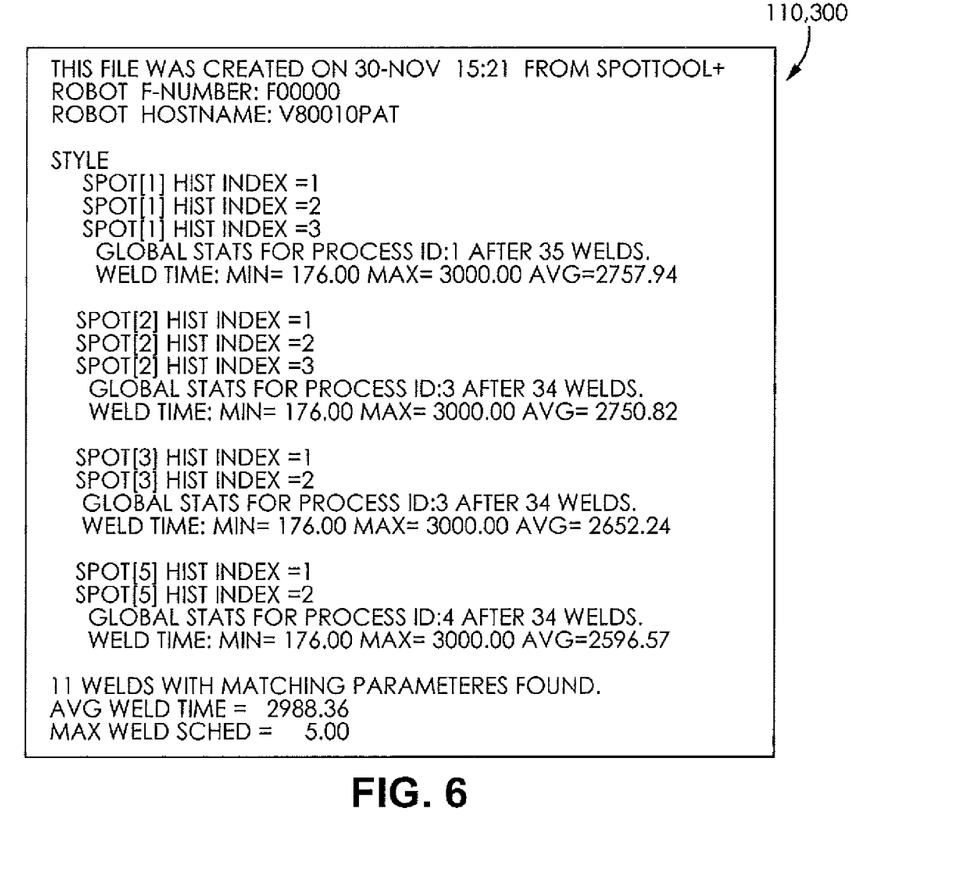
FIG. 6 is an exemplary report generated from a filtering of collected process data as shown in FIGS. 4-5.
Figure 7:
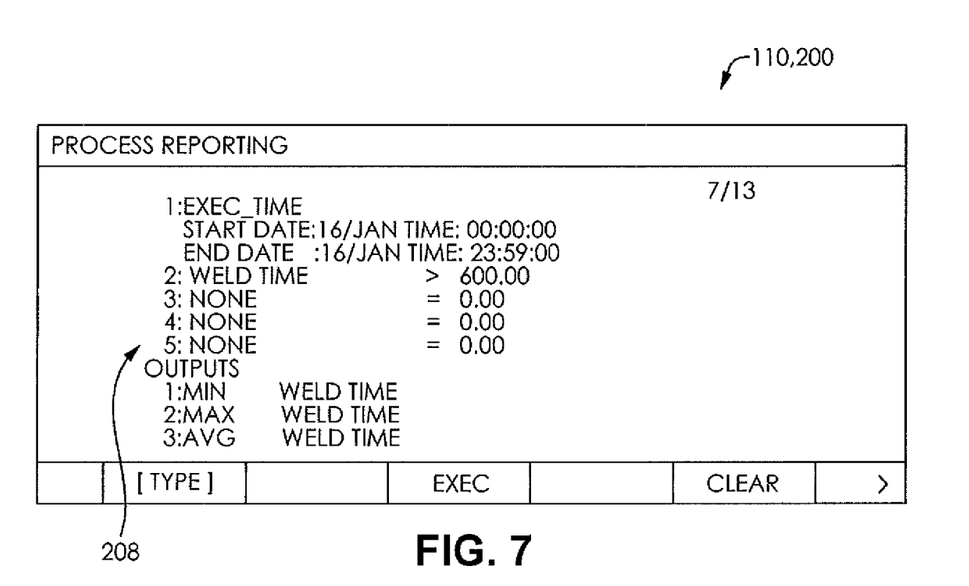
FIG. 7 is a different view of the display on the teach pendant as shown in FIG. 4, the display permitting a user to filter collected process data and generate a report, the display shown post-selection by the user.

As shown in FIGS. 4, 5 and 7, the display 200 may also include at least one filter field 208 that permits a user to create a report 300 (shown in FIGS. 6 and 8) based on a selected type of the associated process data. The filter field 208 may be limited to criteria such as start date and end date, time, and output minimums and maximums. The comparator for the filter field 208 can be, as a nonlimiting example, greater than (>), less than (<), or equal to (=), and the user can specify the value to which to compare the filter field 208. Other types of filter criteria may also be employed to generate the report 300 from the associated process data.

Figure 8:
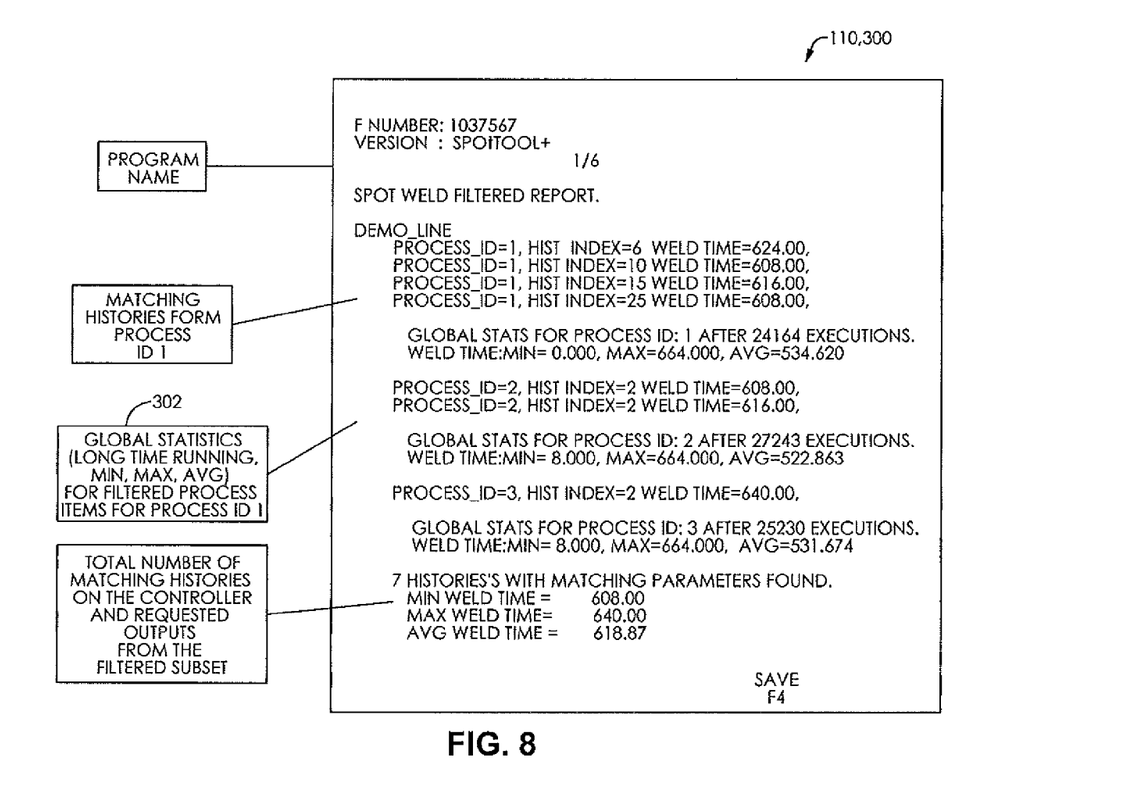
FIG. 8 is an exemplary report generated from a filtering of collected process data as shown in FIGS. 4 and 7.

As shown in FIG. 8, the report 300 generated from the associated process data may also include a statistical analysis 302 of the collected process data. Any suitable form of statistical analysis that may be performed on the associated process data may be provided on the report 300, as desired.

Figure 9:
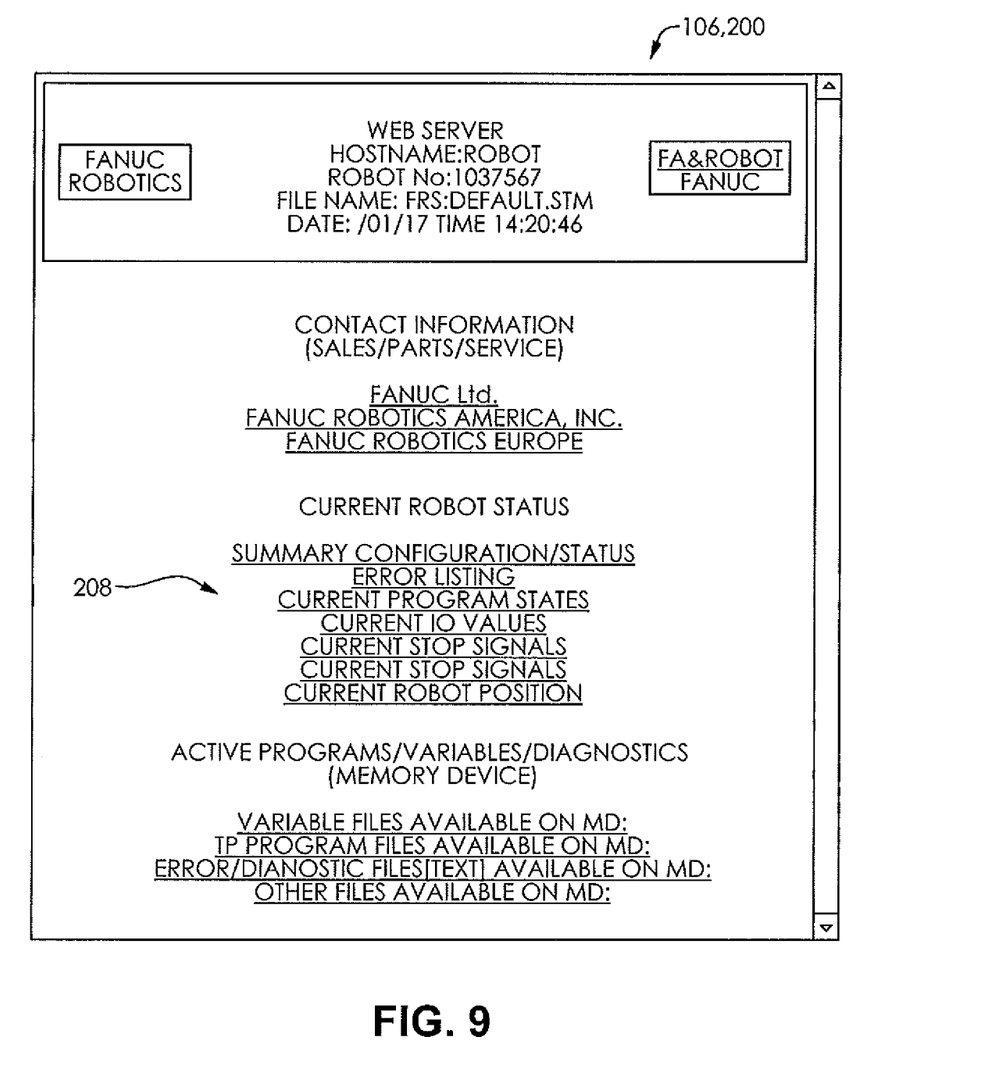
FIG. 9 is an exemplary display of an Internet-based interface for display and filtering of collected process data to generate a tabular report.
Figure 10:
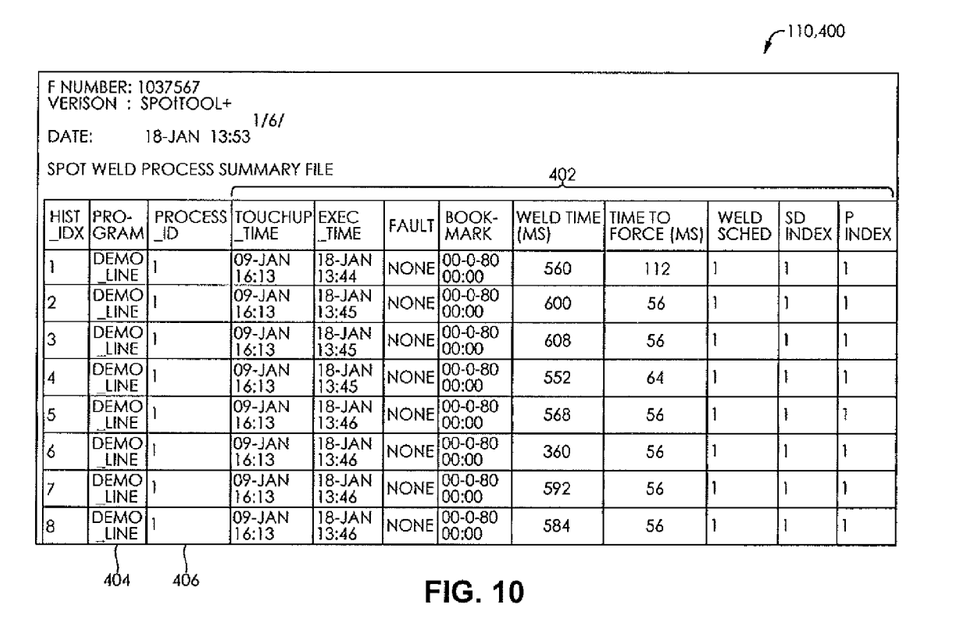
FIG. 10 is an exemplary display of the tabular report generated from collected process data via the Internet-based interface shown in FIG. 9.

With reference to FIGS. 9 and 10, the steps of displaying and reporting the stored process data for each of the process instructions may include the personal computer 106. For example, where the data storage is either accessed via the network 108 such as the Internet, or located on the personal computer 106 itself, the display 200 may provided on the personal computer 106. Like the display 200 on the teaching pendant 110, the display 200 on the personal computer 106 shown in FIG. 9 may include filter fields 208 for the generation of the report 300.

As shown in FIG. 10, the personal computer 106 may also permit the generation of a tabular report 400. The tabular report 400 may include at least one process data column 402, as well as a unique program identifier column 404 and a unique process instruction identifier column 406 with which the process data 402 is tagged. The tabular report 400 may be provided in a file format that allows the report to be opened and viewed in common spreadsheet software, where subsequent further analysis of the associated process data may be performed. Other types of reports using the associated process data may also be generated within the scope of the present disclosure.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for controlling a robot comprising the steps of:
   executing a control program having a plurality of process instructions on a robot controller in communication with the robot, the robot interacting with process equipment to perform processes in response to the process instructions during the execution of the control program;
   collecting associated process data for each of predetermined ones of the process instructions executed by the robot controller, the process data including time of execution of the associated predetermined process instruction and additional data specific to operation of at least one of the robot and the process equipment as the processes are being performed, wherein the additional data includes at least one of an identifier of a specific location in the robot's path, process measurements captured by the robot from external sensors or controls, and processes internal to the robot controller; and
   storing the collected process data in a form identified by at least one unique identifier.

2. The method of claim 1, wherein the at least one unique identifier is at least one of a program identifier and a process instruction identifier.

3. The method of claim 2, wherein the at least one unique identifier includes both the program identifier and the process instruction identifier.

4. The method of claim 1, wherein the associated process data is collected during execution of the control program each time one of the predetermined ones of process instructions is executed.

5. The method of claim 1, wherein the additional data includes at least one of time associated position was touched up, process instruction identifier, robot location, part thickness before and after weld, servogun temperature, feedback from weld time, servogun force requested and achieved, weld time, weld distances, average current, average voltage, and average wire feed speed, arc retry counts, work and travel angle, count for voltage/current exceeding threshold, average electrostatic voltage, gun on time, maximum bell speed, minimum bell speed, average bell speed, maximum shaping air, minimum shaping air, average shaping air, pump torque, setpoint errors, sealant applied, maximum material pressure, minimum material pressure, and average material pressure.

6. The method of claim 1, wherein the associated process data is stored on one of an internal memory of the robot controller, an external memory device, and a remote device.

7. The method of claim 1, further comprising a step of displaying and reporting the stored process data for each of the process instructions.

8. The method of claim 5, wherein the stored process data is displayed on one of a teach pendant and a personal computer.

9. The method of claim 5, wherein the displaying and the reporting is performed in non-real time.

10. The method of claim 5, wherein a display includes at least one filter field that permits a user to create a report based on a selected type of the associated process data.

11. The method of claim 10, wherein the report is generated that includes a statistical analysis of the collected process data.

12. The method of claim 5, wherein a display includes a first pane, a second pane, and third pane, the first pane showing the process instructions executed by the robot controller, the second pane showing the associated process data, and the third pane showing a trend of a selected type of the associated process data.

13. The method of claim 5, wherein a display includes at least one threshold value relative to the collected process data.

14. The method of claim 5, wherein a threshold alarm is generated when the collected process data exceeds the at least one threshold value.

15. A method for controlling a robot comprising the steps of:
    executing a control program having a plurality of process instructions on a robot controller in communication with the robot, the robot interacting with process equipment to perform processes in response to the process instructions during the execution of the control program;
    collecting associated process data for each of predetermined ones of the process instructions executed by the robot controller, the process data including time of execution of the associated predetermined process instruction and additional data specific to operation of at least one of the robot and the process equipment as the processes are being performed, wherein the additional data includes at least one of an identifier of a specific location in the robot's path, process measurements captured by the robot from external sensors or controls, and processes internal to the robot controller; and
    storing the collected process data in a form identified by at least one unique identifier, wherein the at least one unique identifier includes both a program identifier and a process instruction identifier, and the collected process data is stored on the robot controller.

16. A system for controlling a robot, comprising:
    a robot controller in communication with the robot and for executing a control program having a plurality of process instructions, the robot interacting with process equipment to perform processes in response to the process instructions during the execution of the control program; and
    a data storage on which associated process data for each of predetermined ones of the process instructions executed by the robot controller is collected and stored, the process data stored in a form identified by at least one unique identifier, the process data including time of execution of the associated predetermined process instruction and additional data specific to operation of at least one of the robot and the process equipment as the processes are being performed, wherein the additional data includes at least one of an identifier of a specific location in the robot's path, process measurements captured by the robot from external sensors or controls, and processes internal to the robot controller.

17. The system of claim 16, wherein the data storage includes one of an internal memory of the robot controller, an external memory device, and a remote device.

18. The system of claim 16, further including a teach pendant in communication with the robot controller.

19. The system of claim 18, wherein the teach pendant permits a user to create a report based on a selected type of the associated process data.

20. The system of claim 18, wherein teach pendant has a display includes a first pane, a second pane, and third pane, the first pane showing the process instructions executed by the robot controller, the second pane showing the associated process data, and the third pane showing a trend of a selected type of the associated process data.

* * * * *